(12) United States Patent
Fan et al.

(10) Patent No.: US 12,512,141 B2
(45) Date of Patent: Dec. 30, 2025

(54) REFRESH ADDRESS COUNTING CIRCUIT AND METHOD, REFRESH ADDRESS READ-WRITE CIRCUIT AND ELECTRONIC DEVICE

(71) Applicant: CHANGXIN MEMORY TECHNOLOGIES, INC., Hefei (CN)

(72) Inventors: Xian Fan, Hefei (CN); Yinchuan Gu, Hefei (CN); Xianlei Cao, Hefei (CN); Yu Yang, Hefei (CN); Hsin-Cheng Su, Hefei (CN)

(73) Assignee: CHANGXIN MEMORY TECHNOLOGIES, INC., Hefei (CN)

( * ) Notice: Subject to any disclaimer, the term of this patent is extended or adjusted under 35 U.S.C. 154(b) by 163 days.

(21) Appl. No.: 18/454,104

(22) Filed: Aug. 23, 2023

(65) Prior Publication Data

US 2023/0395119 A1    Dec. 7, 2023

Related U.S. Application Data

(63) Continuation of application No. PCT/CN2022/090625, filed on Apr. 29, 2022.

(30) Foreign Application Priority Data

Aug. 16, 2021    (CN) .......................... 202110935931.0

(51) Int. Cl.
*G11C 11/406* (2006.01)
*G11C 11/4072* (2006.01)

(52) U.S. Cl.
CPC .. *G11C 11/40615* (2013.01); *G11C 11/40618* (2013.01); *G11C 11/4072* (2013.01)

(58) Field of Classification Search
CPC ........ G11C 11/40615; G11C 11/40618; G11C 11/4072; G11C 11/4087; Y02D 10/00
See application file for complete search history.

(56) References Cited

U.S. PATENT DOCUMENTS

| 10,665,273 B2 | 5/2020 | Kim et al. |
| 2013/0332669 A1 | 12/2013 | Matsumoto |
| 2017/0069371 A1 | 3/2017 | Shin |

(Continued)

FOREIGN PATENT DOCUMENTS

| CN | 109949844 A | 6/2019 |
| CN | 112837727 A | 5/2021 |

OTHER PUBLICATIONS

International Search Report in the international application No. PCT/CN2022/090625, mailed on Jul. 27, 2022. 2 pages.

(Continued)

*Primary Examiner* — Sultana Begum
(74) *Attorney, Agent, or Firm* — Syncoda LLC; Feng Ma

(57) ABSTRACT

A refresh address counting circuit, a refresh address counting method, and a refresh address read-write circuit are provided. The refresh address counting circuit includes: a self-oscillation clock generation circuit, configured to generate, in each of refresh cycles, a self-oscillation clock signal based on at least one array activation signal upon acquiring a refresh signal; a self-oscillation mask circuit, configured to generate a self-oscillation mask signal under a preset refresh command; and a refresh address counter, configured to counting a refresh address based on the self-oscillation clock signal and the self-oscillation mask signal and to output a self-oscillation refresh address.

9 Claims, 16 Drawing Sheets

(56) References Cited

U.S. PATENT DOCUMENTS

2017/0316818 A1 11/2017 Saifuddin et al.
2019/0189194 A1  6/2019 Kim
2020/0401476 A1 12/2020 Cha et al.
2021/0043246 A1  2/2021 Lee

OTHER PUBLICATIONS

Extended European Search Report in U.S. Appl. No. 22/857,334, mailed on Jul. 1, 2024.

REFRESH ADDRESS COUNTING CIRCUIT AND METHOD, REFRESH ADDRESS READ-WRITE CIRCUIT AND ELECTRONIC DEVICE

CROSS-REFERENCE TO RELATED APPLICATIONS

This application is a continuation of International Application No. PCT/CN2022/090625, filed on Apr. 29, 2022, which claims priority of Chinese patent application No. 202110935931.0, filed on Aug. 16, 2021. The disclosures of International Application No. PCT/CN2022/090625 and Chinese patent application No. 202110935931.0 are hereby incorporated by reference in their entireties.

BACKGROUND

The double data rate fifth-generation synchronous dynamic random-access memory (DDR5 SDRAM) is a high-bandwidth computer memory.

DDR5 generally includes two types of refresh commands: an all-bank refresh command and a same-bank refresh command. The same-bank refresh command only refreshes one bank at a time. The all-bank refresh command refreshes all-banks at a time. Thus, the counting methods for specific refresh times are also different.

At present, the refresh method suitable for one type of refresh command cannot satisfy the refresh method of DDR5. Therefore, determination of a unified counting circuit suitable for DDR5 has become an existing urgent problem to be solved.

SUMMARY

The present disclosure relates to the technical field of integrated circuits, and specifically relates to a refresh address counting circuit, a refresh address counting method, a refresh address read-write circuit, and an electronic device.

According to a first aspect of the present disclosure, a refresh address counting circuit is provided. The circuit includes: a self-oscillating clock generation circuit configured to generate, upon acquiring a refresh signal, a self-oscillating clock signal based on at least one bank activation signal in each of refresh cycles; a self-oscillating mask circuit configured to generate a mask signal under a preset refresh command; and a refresh address counter configured to count refresh addresses based on the self-oscillating clock signal and the mask signal and to output a self-oscillating refresh address.

According to the second aspect of the present disclosure, a refresh address counting method is provided, which is used for the above refresh address counting circuit, the method includes: a self-oscillating clock signal is generated by a self-oscillating clock generation circuit based on at least one bank activation signal in each of refresh cycles upon acquiring a refresh signal; a mask signal is generated by a self-oscillating mask circuit under a preset refresh command; and refresh addresses are counted by a refresh address counter based on the self-oscillating clock signal and the mask signal and a self-oscillating refresh address is output by the refresh address counter.

According to the third aspect of the present disclosure, a refresh address read-write circuit is provided, which includes a latch circuit, a decoder, a reading circuit, and the above refresh address counting circuit, where an output terminal of the refresh address counting circuit is connected to an input terminal of the latch circuit, an output terminal of the latch circuit is connected to an input terminal of the decoder, and an output terminal of the decoder is connected to the reading circuit.

According to the fourth aspect of the present disclosure, an electronic device is provided, which includes multiple banks; and a bank control circuit provided with the above refresh address counting circuit.

DETAILED DESCRIPTION

Figure 1:
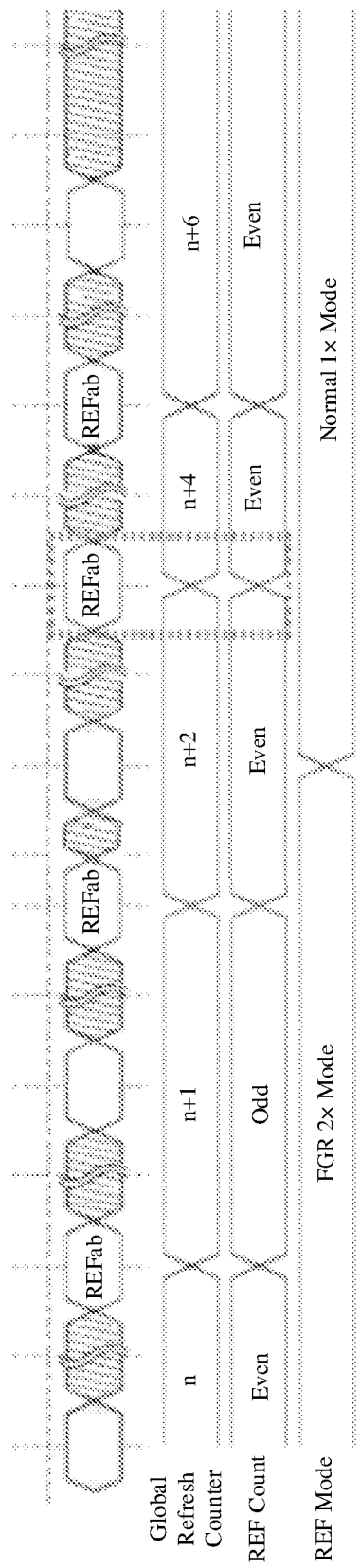
FIG. 1 schematically shows a first schematic diagram of refresh address counting in a refresh mode switching process under an all-bank refresh command in DDR5.

Exemplary embodiments will be more comprehensively described with reference to the drawings. However, the exemplary embodiments may be implemented in a variety of forms, and should not be understood to be limited to the examples set forth herein. Rather, these embodiments are provided so that the present disclosure will be more comprehensive and complete and so that the concept of the exemplary embodiments is comprehensively communicated to those who are skilled in the art. The features, structures, or characteristics described may be incorporated in one or more embodiments by using any suitable means. In the following description, numerous specific details are presented to provide a sufficient understanding of the embodiments of the present disclosure. However, a person skilled in the art will be aware that the technical solutions of the present disclosure may be implemented by omitted one or more of the specific details, or by using other methods, components, devices, steps, and the like. In other situations, known technical solutions are not shown or described in detail so as not to detract the main points and obscure various aspects of the present disclosure.

Furthermore, the drawings are merely schematic representations of the present disclosure and are not necessarily drawn to scale. The same reference marks in the drawings denote the same or similar parts, and therefore repeated descriptions thereof will be omitted. Some of the block diagrams shown in the drawings are functional entities and do not necessarily have to correspond to physically or logically separate entities. These functional entities may be implemented as software, or implemented in one or more hardware modules or integrated circuits, or implemented in different networks and/or processor devices and/or microcontroller devices.

The flowchart shown in the drawings is for illustrative purposes only and does not necessarily include all steps. For example, some steps may also be separated, while some steps may be combined or partially combined, and thus the actual execution order may vary according to actual situations. In addition, all of the terms "first", "second", and "third" below are for purposes of distinction only and should not be used as limitations on the content of the present disclosure.

DDR4 is the abbreviation for the fourth-generation DDR SDRAM. DDR5 is the abbreviation for the fifth-generation DDR SDRAM. DDR SDRAM is an abbreviation for double data rate SDRAM, while SDRAM is an abbreviation for synchronous dynamic random access memory, and a synchronization object is a system clock frequency. Thus, in combination, DDR4 is a fourth-generation double data rate synchronous dynamic random-access memory, and DDR5 is a fifth-generation double data rate synchronous dynamic random-access memory. From DDR4 to DDR5, a refresh instruction changes from a single refresh command to an all-bank refresh command REFab and a same-bank refresh command REFsb.

For DDR5, multiple refresh modes (REF Modes) are typically included, including a normal refresh mode (Normal 1×), a double-rate normal refresh mode (Normal 2×), a double fine-grained refresh mode (FGR 2×), etc.

With reference to FIG. 1, for an all-bank refresh command REFab, in the normal refresh mode (Normal 1×), when the REFab command is processed in a DRAM, a self-oscillating refresh address is generated, and meanwhile a global refresh counter performs global refresh counting. While the self-oscillating refresh address is being generated, the parity (REF Count) of the current self-oscillating refresh address is monitored. In FIG. 1, Odd represents an odd number, and Even represents an even number.

As shown in FIG. 1, when the refresh mode (REF Mode) switches from FGR 2× to Normal 1×, if the current count of REF Count is an even number Even, then the global refresh counter continues to count in an even number counting manner, i.e., a +2 manner, so that the REF Count is still recorded as an even number Even at the end of Normal 1×.

Figure 2:
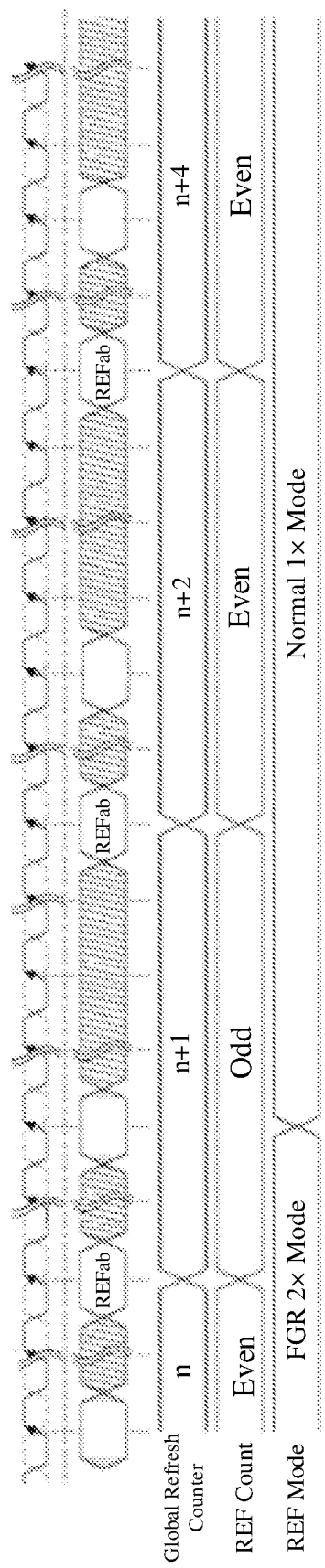
FIG. 2 schematically shows a second schematic diagram of refresh address counting in a refresh mode switching process under an all-bank refresh command in DDR5.

With reference to FIG. 2, when the refresh mode (REF Mode) switches from FGR 2× to Normal 1×, if the current count of REF Count is an odd number Odd, then in the Normal 1× refresh mode, when the REFab command is received for the first time, REF Count is first added by 1 so as to obtain an even number Even, and then counting is performed as normal in the +2 manner to ensure that the recorded REF Count is still an even number Even at the terminal of the Normal 1× refresh mode.

It should be noted that one refresh interval is present between two adjacent REFab commands in FIG. 1 and FIG. 2.

Figure 3:
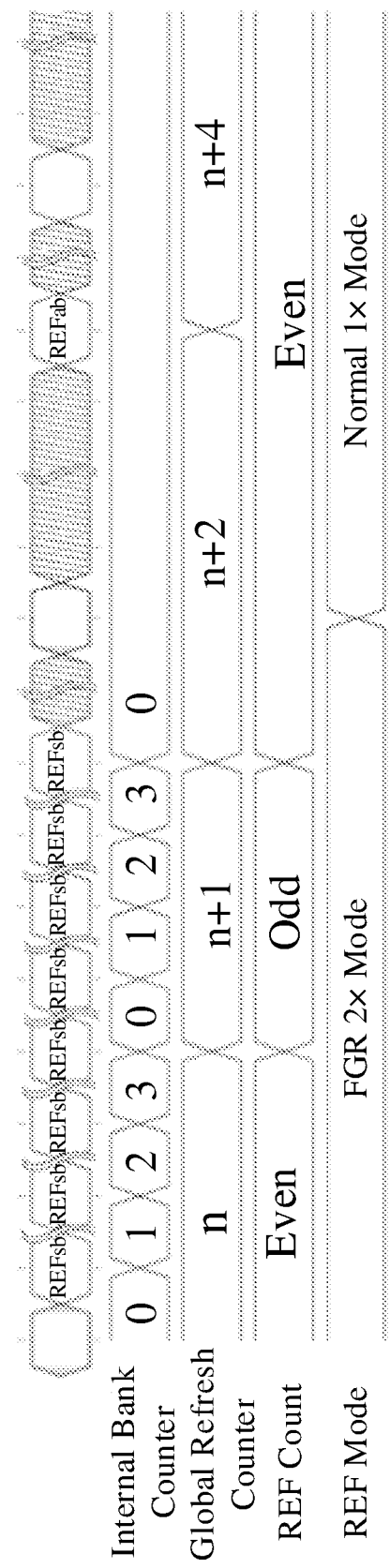
FIG. 3 schematically shows a schematic diagram of refresh address counting under a same-bank refresh command in DDR5.

With reference to FIG. 3, for a same-bank refresh command REFsb, each REFsb command only correspondingly refreshes one bank. Therefore, before all banks are refreshed, the global refresh counter does not increment for consecutively issued REFsb commands. The global refresh counter does not increment until all banks have been refreshed. To count the number of banks per refresh, an internal bank counter is also added in FIG. 3 to count each bank refreshed under the REFsb command.

Since the refresh command of DDR5 and the refresh command of DDR4 are different, and a different counting manner is used in a refresh mode switching process in DDR5, the counting manner applicable to DDR4 thus cannot meet the requirements of DDR5.

Figure 4:
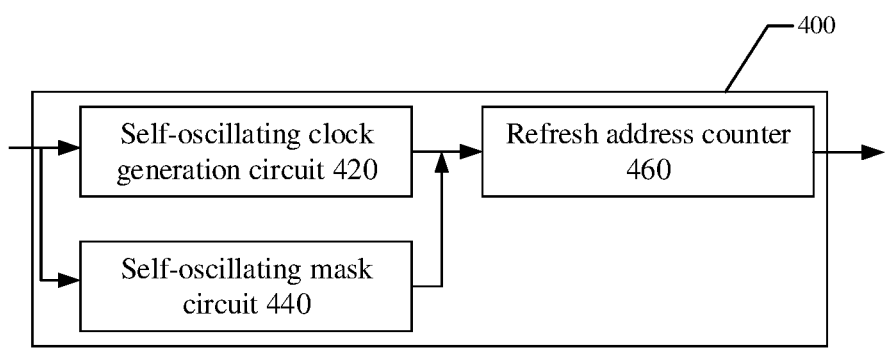
FIG. 4 schematically shows a block diagram of a refresh address counting circuit according to an exemplary embodiment of the present disclosure.

In view of this, an exemplary embodiment of the present disclosure provides a refresh address counting circuit, and the refresh address counting circuit is mainly used in DDR5. With reference to FIG. 4, a refresh address counting circuit 400 may include a self-oscillating clock generation circuit 420, a self-oscillating mask circuit 440, and a refresh address counter 460.

Figure 5:
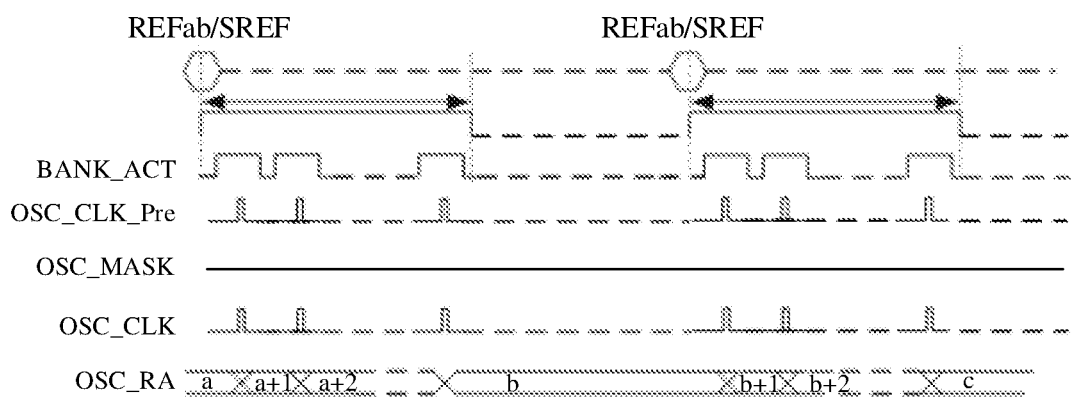
FIG. 5 schematically shows a first schematic diagram of signal waveform corresponding to the refresh address counting circuit shown in FIG. 4.
Figure 6:
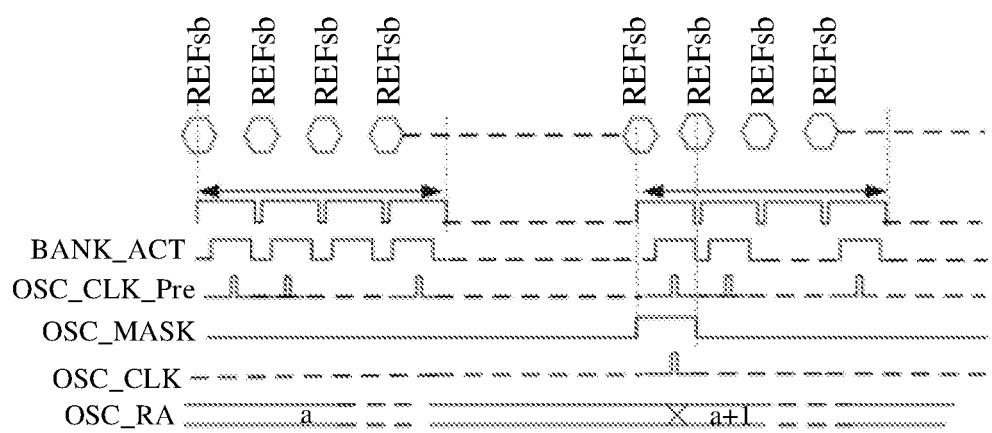
FIG. 6 schematically shows a second schematic diagram of signal waveform corresponding to the refresh address counting circuit shown in FIG. 4.

The self-oscillating clock generation circuit 420 may be configured to generate, upon acquiring a refresh signal, a self-oscillating clock signal based on at least one bank activation signal in each of refresh cycles. With reference to FIG. 5 and FIG. 6, the self-oscillating clock generation circuit 420 is mainly configured to generate a self-oscillating clock signal OSC_CLK_Pre. As long as a bank activation signal BANK_ACT is currently present, the self-oscillating clock signal OSC_CLK_Pre will be generated regardless of whether a current refresh instruction is an all-bank refresh command REFab or a same-bank refresh command REFsb. In addition, one bank activation signal BANK_ACT corresponds to one self-oscillating clock signal OSC_CLK_Pre.

The self-oscillating mask circuit 440 may be configured to generate a mask signal under a preset refresh command. In an exemplary embodiment of the present disclosure, the preset refresh command may be the above same-bank refresh command REFsb, the all-bank refresh command REFab, and may also be a self-refresh command SREF. For example, in one refresh cycle, the mask signal OSC_MASK generated by the self-oscillating mask circuit 440 may be used to mask the self-oscillating clock signal OSC_CLK_Pre.

In an actual application, all banks are refreshed under an all-bank refresh command REFab or a self-refresh command SREF, which is equivalent to one refresh cycle, and therefore, as shown in FIG. 5, the mask signal OSC_MASK does not mask the self-oscillating clock signal OSC_CLK_Pre under one all-bank refresh command REFab or self-refresh command SREF. In this case, the generated mask signal OSC_MASK is a non-mask sub-signal. This means that the non-mask sub-signal is used to not mask the self-oscillating clock signal OSC_CLK_Pre under the all-bank refresh command REFab or the self-refresh command SREF.

However, multiple same-bank refresh commands REFsb are typically generated in one refresh cycle. Therefore, as shown in FIG. 6, in one refresh cycle, the self-oscillating clock signal OSC_CLK_Pre generated based on the multiple bank activation signals BANK_ACT is masked by the mask signal OSC_MASK, and a masked target self-oscillating clock signal OSC_CLK is generated only once in one refresh cycle. In this case, the generated mask signal OSC_MASK is a mask sub-signal, and the mask sub-signal is used to mask the self-oscillating clock signal OSC_CLK_Pre under the same-bank refresh command REFsb.

In an exemplary embodiment of the present disclosure, the above self-oscillating clock signal OSC_CLK_Pre and mask signal OSC_MASK are both steady and sustained oscillations that are self-generated without any externally applied excitation signals. Therefore, self-oscillation is added to the names of the self-oscillating clock signal OSC_CLK_Pre and the mask signal OSC_MASK as an indication.

In the refresh address counting circuit provided in an exemplary embodiment of the present disclosure, the refresh address counter 460 may be configured to count refresh addresses based on the self-oscillating clock signal OSC_CLK_Pre and the mask signal OSC_MASK and to output a self-oscillating refresh address OSC_RA. That is, the refresh address counter 460 counts the refresh addresses based on a result of masking of the self-oscillating clock signal OSC_CLK_Pre performed by the mask signal OSC_MASK.

In an exemplary embodiment of the present disclosure, in addition to the self-oscillating clock signal OSC_CLK_Pre being masked by means of the mask signal OSC_MASK in one refresh cycle so as to count refresh addresses as described above, there are also the situations that are shown in FIG. 1 and FIG. 2, that is, in a refresh mode switching process, the self-oscillating clock signal OSC_CLK_Pre is masked based on a parity state of a current refresh address.

Figure 7:
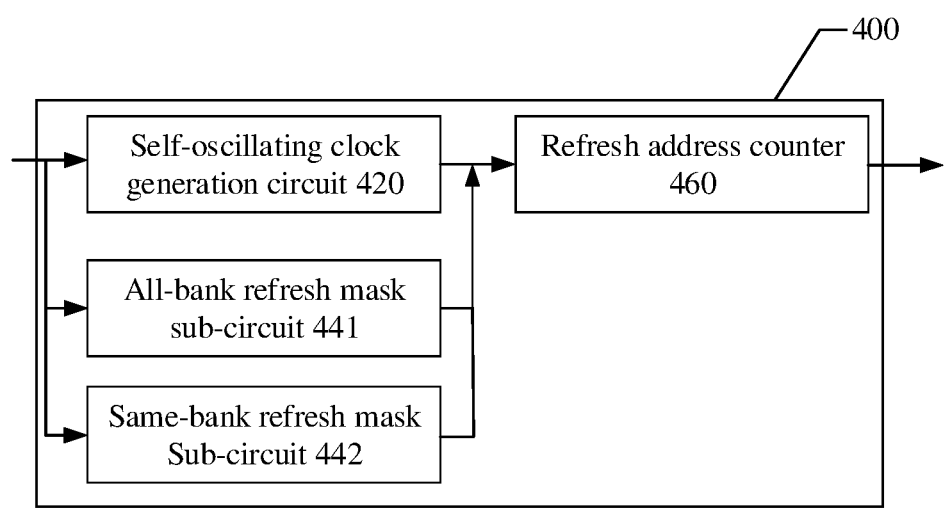
FIG. 7 schematically shows a block diagram of another refresh address counting circuit according to an exemplary embodiment of the present disclosure.

Specifically, in the exemplary embodiment of the present disclosure, with reference to FIG. 7, the self-oscillating mask circuit 440 includes an all-bank refresh mask sub-circuit 441 and a same-bank refresh mask sub-circuit 442. The all-bank refresh mask sub-circuit 441 may be configured to generate a mask sub-signal in a normal refresh mode Normal 1× upon reception of an all-bank refresh command REFab when the lowest bit REF Count of a current refresh address is an odd number Odd. The mask sub-signal masks the self-oscillating clock signal OSC_CLK_Pre so that all-bank address alignment work is first performed in the first cycle. Then, an even address is newly generated, so that the refresh address generated at the end of refreshing is still an even address.

Once a mask sub-signal is generated, if the mask sub-signal needs to be turned off, then the all-bank refresh mask sub-circuit 441 may be used to turn off the mask sub-signal and to generate a non-mask sub-signal when a system reset signal RST is generated or when a cycle refresh command REF2 is received in the next refresh cycle, so that after the refresh address is masked in a first refresh cycle, the mask is released in a second refresh cycle, so as to ensure that the final refresh address is an even address.

In addition, the all-bank refresh mask sub-circuit 441 may be further configured to generate the non-mask sub-signal in the normal refresh mode Normal 1× upon reception of the all-bank refresh command REFab when the lowest bit of the current refresh address is an even number Even, so as to maintain the normal counting of refresh addresses, so that the refresh address generated after refreshing has ended is still an even address.

Figure 8:
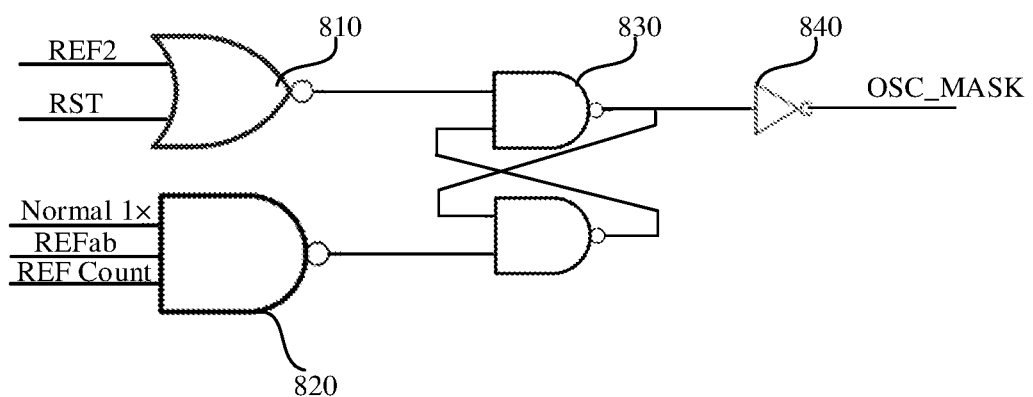
FIG. 8 schematically shows a circuit diagram of an all-bank refresh mask sub-circuit according to an exemplary embodiment of the present disclosure.

On the basis of the above functional description, provided in an exemplary embodiment of the present disclosure is a circuit structure of the all-bank refresh mask sub-circuit 441. With reference to FIG. 8, the all-bank refresh mask sub-circuit 441 includes a first NOR gate 810, a first NAND gate 820, a first latch 830, and a first NOT gate 840. An input terminal of the first NOR gate 810 is configured to receive the system reset signal RST and the cycle refresh command REF2, so as to output a high level when the system reset signal RST and the cycle refresh command REF2 are both low levels. An output terminal of the first NOR gate 810 is connected to a reset terminal of the first latch 830. The first latch 830 includes two NAND gates. When input at the reset terminal of the first latch is a high level, an output terminal of the first latch 830 depends on a signal input at a set terminal of the first latch.

An input terminal of the first NAND gate 820 is configured to receive a normal refresh mode Normal 1× command, the lowest bit odd signal REF Count of the current refresh address, and the all-bank refresh command REFab, and an output terminal of the first NAND gate 820 is connected to the set terminal of the first latch 830. When three input signals of the first NAND gate are all high level, that is, when the all-bank refresh command is received in the normal refresh mode and the lowest bit of the current refresh address is an odd signal, the first NAND gate 820 outputs a low level.

Under the action of the low level output by the first NAND gate 820 and the high level output by the first NOR gate 810, the output terminal of the first latch 830 outputs a low level. However, if at least one of the system reset signal RST and the cycle refresh command REF2 is a high level, the output terminal of the first latch 830 outputs a high level.

In addition, since the output terminal of the first latch 830 is connected to an input terminal of the first NOT gate 840, the output terminal of the first NOT gate 840 outputs the mask signal OSC_MASK. When the first latch 830 outputs a low level, the mask signal OSC_MASK is a high level, i.e., the mask signal OSC_MASK is a mask sub-signal in this case, which is equivalent to the all-bank refresh mask sub-circuit 441 outputting a mask sub-signal when an all-bank refresh command is received in the normal refresh mode and the lowest bit of a current refresh address is an odd signal. When the first latch 830 outputs a high level, the mask signal OSC_MASK is a low level, i.e., the mask signal OSC_MASK is a non-mask sub-signal in this case, which is equivalent to the mask sub-signal being turned off and the non-mask sub-signal being generated when the system reset signal RST is generated or the cycle refresh command REF2 is received.

It should be noted that the above all-bank refresh mask sub-circuit 441 is provided when the high level is valid, and in situations in which the low level is valid, a corresponding inverter is provided. No further details will be described herein.

In an exemplary embodiment of the present disclosure, the same-bank refresh mask sub-circuit 442 may be configured to generate the mask sub-signal upon reception of a same-bank refresh command REFsb before all the banks are refreshed. Therefore, in one refresh cycle, even if a same-bank refresh command is received, the self-oscillating clock signal OSC_CLK_Pre is still masked by means of the mask signal OSC_MASK, so as to achieve the purpose of counting refresh addresses only after all the banks are refreshed.

Figure 9:
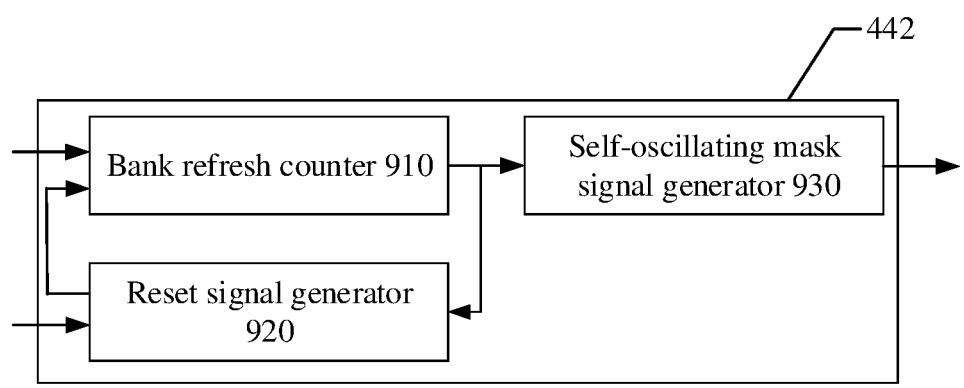
FIG. 9 schematically shows a block diagram of a same-bank refresh mask sub-circuit according to an exemplary embodiment of the present disclosure.

With reference to FIG. 9, in an exemplary embodiment of the present disclosure, the same-bank refresh mask sub-circuit 442 includes a bank refresh counter 910, a reset signal generator 920, and a mask signal generator 930.

The bank refresh counter 910 may be configured to obtain a refresh state of each of the banks, and generate a refresh cycle signal after each bank has been refreshed once. The mask signal generator 930 may be configured to generate the mask sub-signal or the non-mask sub-signal based on the refresh state of each bank. The reset signal generator 920 may be configured to generate a reset signal based on the all-bank refresh command, the self-refresh command, the system reset signal, and the refresh cycle signal. The reset signal resets the bank refresh counter to generate the non-mask sub-signal.

A circuit structure of the bank refresh counter 910, the reset signal generator 920, and the mask signal generator 930 are described below by using an example in which the high level is valid.

Figure 10:
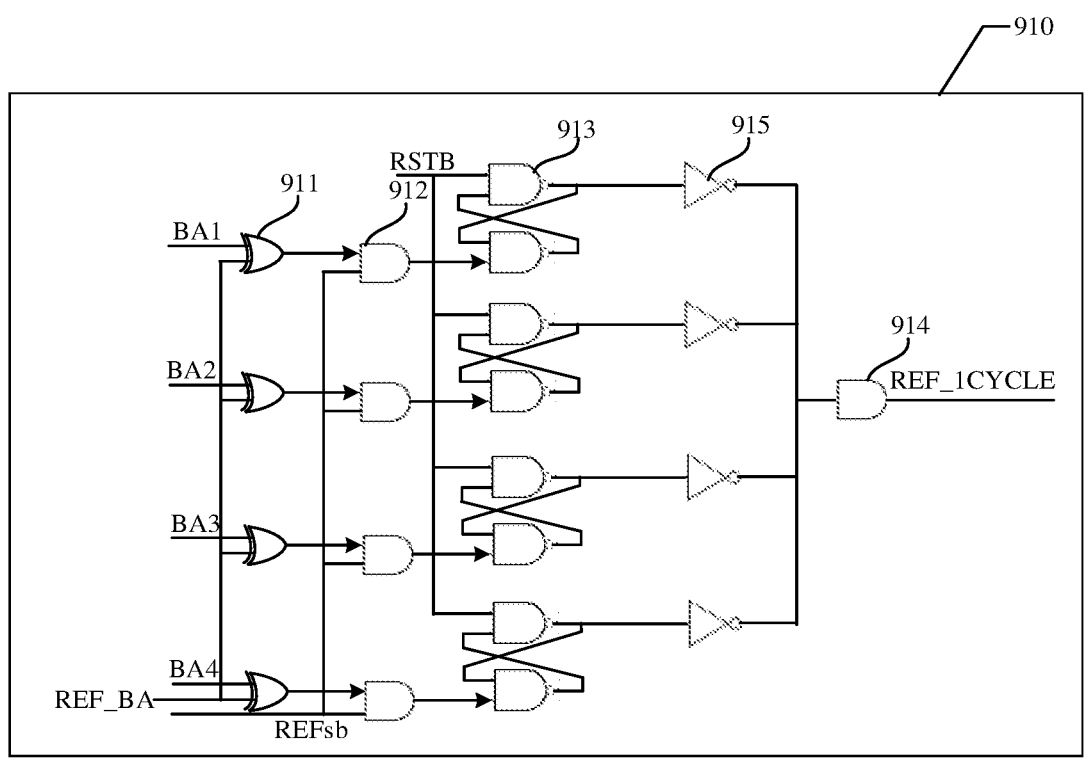
FIG. 10 schematically shows a circuit diagram of a bank refresh counter according to an exemplary embodiment of the present disclosure.

In an exemplary embodiment of the present disclosure, with reference to FIG. 10, the bank refresh counter 910 includes multiple XOR gates 911, multiple first AND gates 912, multiple counters 913, and a second AND gate 914. Each of the multiple XOR gates 911 is configured to receive a preset bank address BA1, BA2, BA3, or BA4 (FIG. 10 shows four banks) and a refresh bank address REF_BA. An output terminal of each XOR gate 911 is connected to a first input terminal of a respective one of the multiple first AND gates 912. Each of the multiple first AND gates 912 has a second input terminal configured to receive the same-bank refresh command REF_SB and an output terminal configured to receive a set terminal of one of the multiple counters 913. Each of the multiple counters 913 has a reset terminal configured to receive a reset signal RSTB. The reset signal RSTB is determined by the reset signal generator 920.

An output terminal of each of the multiple counters 913 is provided with an inverter 915. Each of the multiple inverters 915 outputs the refresh state. Each XOR gate 911 corresponds to a respective first AND gate 912, a respective counter 913, and a respective inverter 915. A group of the XOR gates 911, first AND gates 912, counters 913, and inverters 915 output the refresh state of one bank and outputs, for example, a high level when the bank is refreshed. When four banks are all refreshed, each of the four inverters 915 outputs a high level. At this case, this means that each bank is refreshed once.

After the refresh state of each bank is determined, the refresh state can be received by the second AND gate 914. Specifically, an input terminal of the second AND gate 914 is connected to output terminals of the multiple inverters 915, and an output terminal of the second AND gate 914 is configured to output a refresh cycle signal REF_1CYCLE. When each of the multiple inverters 915 outputs a high level, the refresh cycle signal REF_1CYCLE output by the second AND gate 914 is a high level.

Figure 11:
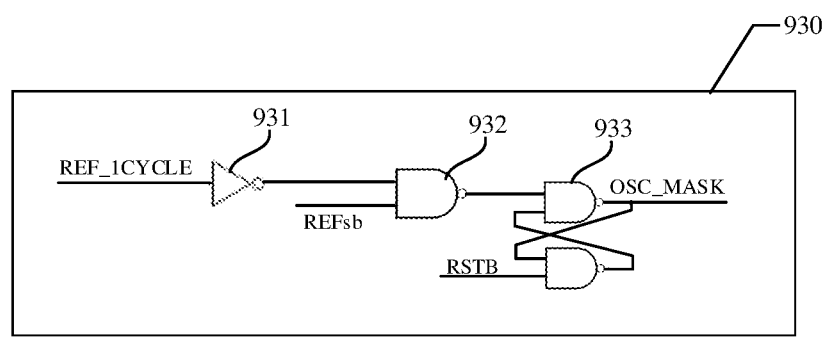
FIG. 11 schematically shows a circuit diagram of a mask signal generator according to an exemplary embodiment of the present disclosure.

In an exemplary embodiment of the present disclosure, with reference to FIG. 11, the mask signal generator 930 includes a second NOT gate 931, a second NAND gate 932, and a second latch 933. A first input terminal of the second NAND gate 932 is configured to receive the refresh cycle signal REF_1CYCLE through the second NOT gate 931. A second input terminal of the second NAND gate 932 is configured to receive the same-bank refresh command REFsb. An output terminal of the second NAND gate 932 is connected to a reset terminal of the second latch 933. A set terminal of the second latch 933 is configured to receive the reset signal RSTB. An output terminal of the second latch 933 is configured to output the mask signal OSC_MASK.

By means of the mask signal generator 930, when the refresh cycle signal REF_1CYCLE is a low level, it is indicated that one refresh cycle is not completed, and at this time, under the action of the same-bank refresh command REFsb, the output mask signal OSC_MASK is a high level, that is, a mask sub-signal is output. When the refresh cycle signal REF_1CYCLE is a high level, it is indicated that one refresh cycle is completed, and at this time, under the action of the same-bank refresh command REFsb, the output mask signal OSC_MASK is a low level, that is, a non-mask sub-signal is output.

Figure 12:
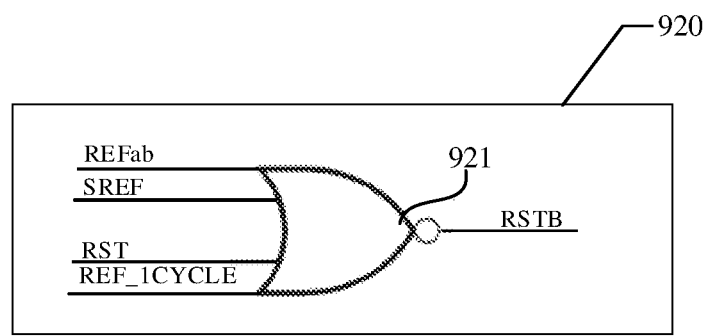
FIG. 12 schematically shows a circuit diagram of a reset signal generator according to an exemplary embodiment of the present disclosure.

In an exemplary embodiment of the present disclosure, with reference to FIG. 12, the reset signal generator 920 includes an NOR gate 921. An input terminal of the NOR gate 921 is configured to receive the all-bank refresh command REFab, the self-refresh command SREF, the system reset signal RST, and the refresh cycle signal REF_1CYCLE, and an output terminal of the NOR gate 921 is configured to output the reset signal RSTB. That is, when any one among the all-bank refresh command REFab, the self-refresh command SREF, the system reset signal RST, and the refresh cycle signal REF_1CYCLE is enabled, the reset signal RSTB is triggered. The triggered reset signal RSTB converts the mask sub-signal generated by the mask signal generator 930 into a non-mask sub-signal.

It can be seen on the basis of the above description that the all-bank refresh mask sub-circuit 441 is configured to generate a mask sub-signal under an all-bank refresh command, and the same-bank refresh mask sub-circuit 442 is configured to generate a mask sub-signal under a same-bank refresh command. The all-bank refresh mask sub-circuit 441 and the same-bank refresh mask sub-circuit 442 relate to different commands. Therefore, in the exemplary embodiment of the present disclosure, the all-bank refresh mask sub-circuit 441 and the same-bank refresh mask sub-circuit 442 are connected in parallel.

Figure 13:
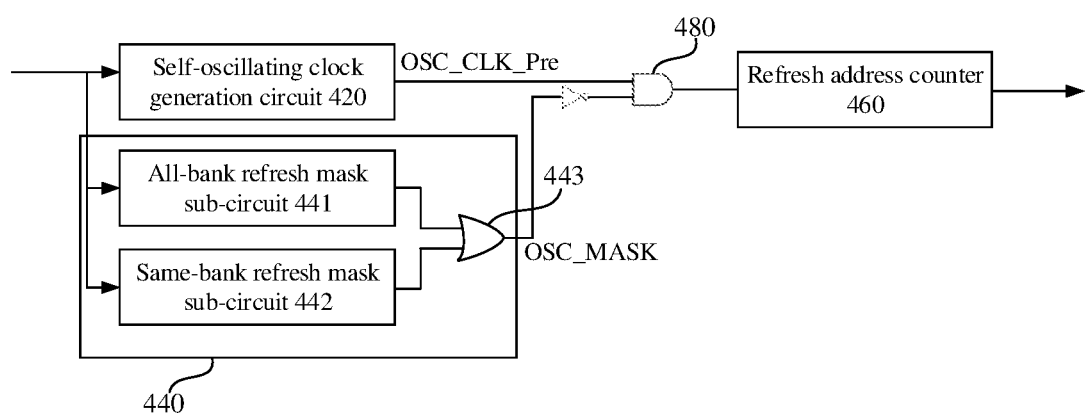
FIG. 13 schematically shows a schematic structural diagram of a refresh address counting circuit according to an exemplary embodiment of the present disclosure.

In addition, with reference to FIG. 13, the self-oscillating mask circuit 440 further includes an OR gate 443. An input terminal of the OR gate 443 is connected to an output terminal of the all-bank refresh mask sub-circuit 441 and an output terminal of the same-bank refresh mask sub-circuit 442, and an output terminal of the OR gate 443 is connected to the refresh address counter 460. When either one among the all-bank refresh mask sub-circuit 441 and the same-bank refresh mask sub-circuit 442 outputs a mask sub-signal, a counting result of the refresh address counter 460 will be affected.

In addition, in the exemplary embodiment of the present invention, when the mask signal OSC_MASK output by the self-oscillating mask circuit 440 masks the self-oscillating clock signal OSC_CLK_Pre output by the self-oscillating clock generation circuit 420, a third AND gate 480 in FIG. 13 is further required. An input terminal of the third AND gate 480 is connected to an output terminal of the self-oscillating mask circuit 440 and an output terminal of the self-oscillating clock generation circuit 420, and an output terminal of the third AND gate 480 is connected to an input terminal of the refresh address counter 460. The third AND gate 480 is configured to mask the self-oscillating clock signal OSC_CLK_Pre when the mask signal OSC_MASK is a low level and to not mask the self-oscillating clock signal OSC_CLK_Pre when the mask signal OSC_MASK is a high level.

Assuming that enabling is performed at a high level, an inverter needs to be further provided so as to invert the mask signal OSC_MASK output by the self-oscillating mask circuit 440, as shown in FIG. 13.

In an actual application, the refresh address counter 460 may include multiple counting circuits. Each of the counting circuits is configured to perform counting based on the self-oscillating clock signal OSC_CLK_Pre that is output by the third AND gate 480 and that is not masked. The counting circuit may include devices such as counters, etc., which will not be specifically defined by the exemplary embodiment of the present disclosure.

Figure 14:
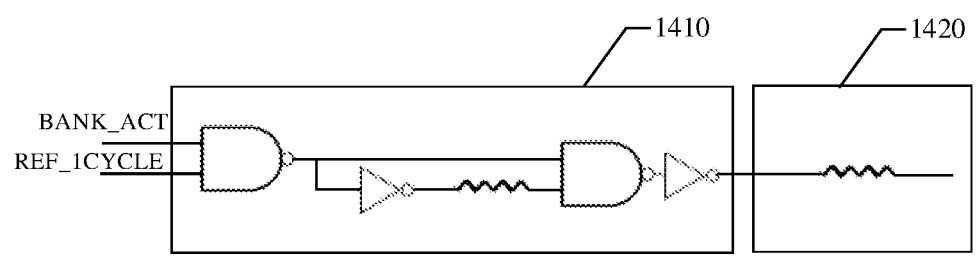
FIG. 14 schematically shows a circuit diagram of a self-oscillating clock generation circuit according to an exemplary embodiment of the present disclosure.

In the exemplary embodiment of the present disclosure, with reference to FIG. 14, the self-oscillating clock generation circuit 420 may include an edge generation circuit 1410 and a delay circuit 1420. The edge generation circuit 1410 is configured to acquire each of the at least one bank activation signal in the refresh cycle, and extract falling edge information of the bank activation signal. The delay circuit 1420 is configured to adjust timing of the falling edge information. Falling edge information eventually output by the self-oscillating clock generation circuit 420 is the self-oscillating clock signal OSC_CLK_Pre.

In an exemplary embodiment of the present disclosure, the edge generation circuit 1410 may include a third NAND gate, a fourth NAND gate, a third NOT gate, a fourth NOT gate, and a first delayer. An input terminal of the third NAND gate is configured to receive the refresh cycle signal and the bank activation signal. An input terminal of the fourth NAND gate is connected to an output terminal of the third NAND gate. An input terminal of the third NOT gate is connected to the output terminal of the third NAND gate. An output terminal of the third NOT gate is connected to the input terminal of the fourth NAND gate. The first delayer is further provided between the output terminal of the third NOT gate and the input terminal of the fourth NAND gate. An output terminal of the fourth NAND gates is connected to an input terminal of the fourth NOT gate. An output terminal of the fourth NOT gate is configured to output the falling edge information of the bank activation signal. The delay circuit 1420 may include a second delayer. An input terminal of the second delayer is connected to the output terminal of the fourth NOT gates, and an output terminal of the second delayer is configured to output the self-oscillating clock signal OSC_CLK_Pre. Herein, the structure of the edge generation circuit 1410 and the delay circuit 1420 is only exemplary, and a different structural form may be configured according to actual requirements, which is not specially defined by the exemplary embodiment of the present disclosure.

In conclusion, the refresh address counting circuit provided in the exemplary embodiment of the present disclosure generates a mask signal by the self-oscillating mask circuit, which can mask the self-oscillating clock signal generated by the bank activation signal according to an actual situation, and can eventually perform the refresh address counting based on the masked self-oscillating clock signal, so as to meet different requirements for different refresh commands in DDR5. In addition, the refresh address counting circuit can also enable refresh address counting to be performed in a refresh mode switching process. Functional requirements for different refresh modes and refresh instructions in DDR5 can be met by means of a single circuit structure, thereby improving the compatibility of the counting circuit.

Figure 15:
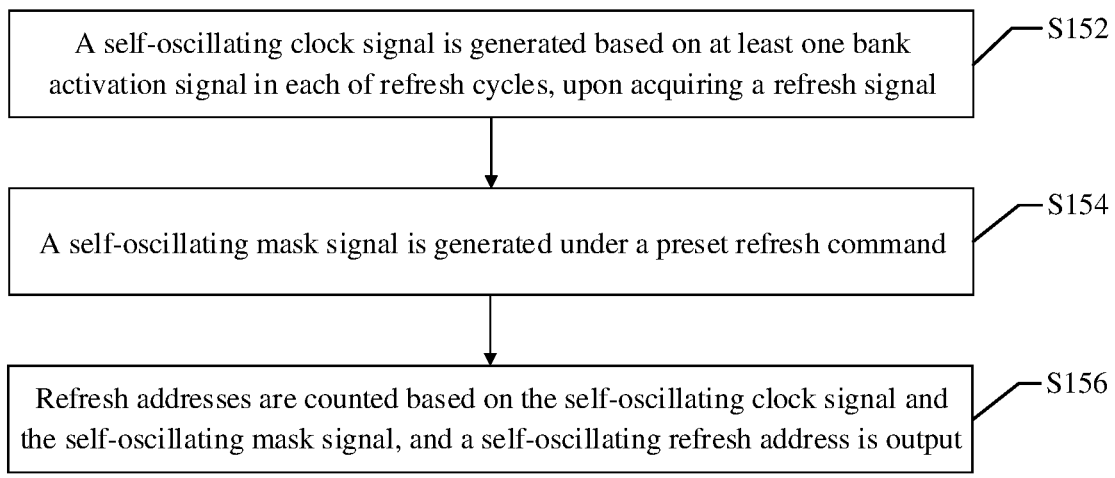
FIG. 15 schematically shows a flowchart of a refresh address counting method according to an exemplary embodiment of the present disclosure.

Also provided in an exemplary embodiment of the present disclosure is a refresh address counting method. With reference to FIG. 15, the refresh address counting method may specifically include the following operations S152, S154 and S156.

In operation S152, self-oscillating clock signal is generated by a self-oscillating clock generation circuit based on at least one bank activation signal in each of refresh cycles, upon acquiring a refresh signal;

In operation S154, a mask signal is generated by a self-oscillating mask circuit under a preset refresh command; and In operation S156, refresh addresses are counted by a refresh address counter based on the self-oscillating clock signal and the mask signal, and a self-oscillating refresh address is output.

Specific details of the operations in the above refresh address counting method have been described in detail in the corresponding refresh address counting circuit, and thus will not be described herein again.

Figure 16:
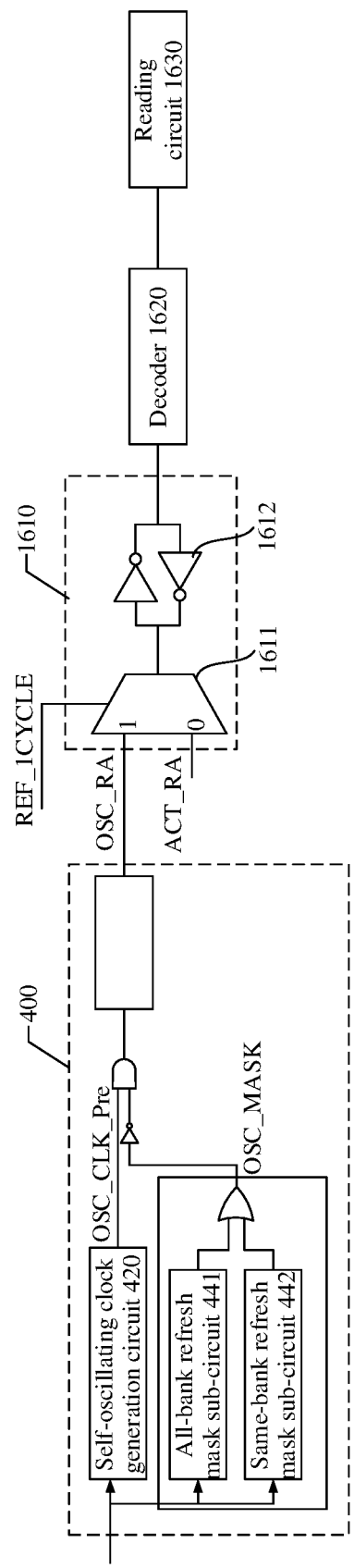
FIG. 16 schematically shows a schematic structural diagram of a refresh address read-write circuit according to an exemplary embodiment of the present disclosure.

Also provided in an exemplary embodiment of the present disclosure is a refresh address read-write circuit. With reference to FIG. 16. The refresh address read-write circuit includes a latch circuit 1610, a decoder 1620, a reading circuit 1630, and the above refresh address counting circuit 400. An output terminal of the refresh address counting circuit 400 is connected to an input terminal of the latch circuit 1610. An output terminal of the latch circuit 1610 is connected to an input terminal of the decoder 1620. An output terminal of the decoder 1620 is connected to the reading circuit 1630. After being latched by the latch circuit 1610, a self-oscillating refresh address output by the refresh address counting circuit can be decoded by the decoder 1620, and read by the reading circuit 1630. For the decoder 1620 and the reading circuit 1630, reference may be made to the existing conventional circuit structures, and the specific structures of the decoder 1620 and the reading circuit 1630 are not specially defined herein.

In an exemplary embodiment of the present disclosure, the latch circuit 1610 includes a multiplexer 1611 and a latch 1612. An input terminal of the multiplexer 1611 is configured to receive a self-oscillating refresh address OSC_RA and activation address ACT_RA from the refresh address counting circuit 400, and a control terminal of the multiplexer 1611 is configured to receive a refresh cycle signal REF_1CYCLE. An output terminal of the multiplexer 1611 is connected to an input terminal of the latch 1612, and an output terminal of the latch 1612 is connected to the decoder 1620. The multiplexer 1611 is configured to, under the control of the refresh cycle signal REF_1CYCLE, select and output the activation address ACT_RA before one cycle of refreshing is completed, and to select and output the self-oscillating refresh address OSC_RA after one cycle of refreshing is completed. The address selected and output by the multiplexer 1611 is latched by the latch 1612.

In addition, the specific structural form of the refresh address counting circuit 400 has been described in detail in the above embodiment, and thus will not be further described herein.

Also provided in an exemplary embodiment of the present disclosure is an electronic device. The electronic device may include multiple banks and a bank control circuit. The bank control circuit is provided with the above refresh address counting circuit. The specific structural details of the refresh address counting circuit have been described in detail in the above embodiment, and thus will not be further described herein.

The above embodiment may be implemented in whole or in part by software, hardware, firmware, or any combination thereof. When implemented by using a software program, the above embodiment may be implemented in whole or in part in the form of a computer program product. The computer program product includes one or more computer commands. When a computer program command is loaded and executed on a computer, the processes or functions according to the embodiments of the present disclosure are generated in whole or in part. The computer may be a general purpose computer, a special purpose computer, a computer network, or other programmable devices. The computer command may be stored in a computer readable storage medium, or transmitted from a computer readable storage medium to another computer readable storage medium. The computer readable storage medium may be any available medium that a computer can access, or may be a data storage device that includes one or more servers, data centers, and the like, that can be integrated with media. The available media may be magnetic media (e.g., a floppy disk, a hard disk, or a magnetic tape), optical media (e.g., a DVD), semiconductor media (e.g., a solid state disk (SSD)) or the like. In the embodiments of the present disclosure, the computer may include the foregoing devices.

Although the present disclosure is described herein with reference to various embodiments, during implementation of the present disclosure that is set forth, a person skilled in the art may understand and implement other variations of the embodiments of the present disclosure by examining the drawings, the description, and the appended claims. In the claims, the term "comprising" does not exclude other components or steps, and "a" or "an" does not exclude plural scenarios. A single processor or other unit may implement several functions recited in the claims. Certain measures are set forth in dependent claims which are different from each other, but this does not mean that these measures cannot be combined to achieve good effects.

While the present disclosure is described with reference to specific features and embodiments thereof, it is apparent that various modifications and combinations may be made to the present disclosure without departing from the spirit and scope thereof. Accordingly, the present description and drawings are merely exemplary illustrations of the present disclosure as defined by the appended claims, and are to be considered to cover any and all modifications, variations, combinations, or equivalents within the scope of the present disclosure. It is obvious that various modifications and variations of the present disclosure may be made by a person skilled in the art without departing from the spirit and scope of the present disclosure. Therefore, if such modifications and variations of the present disclosure fall within the scope of the claims of the present disclosure and equivalent technology thereof, then the present disclosure is also intended to include such modifications and variations.

The invention claimed is:

1. A refresh address counting circuit, comprising:
   a self-oscillating clock generation circuit, configured to generate a self-oscillating clock signal based on at least one bank activation signal in each of refresh cycles, upon acquiring a refresh signal;
   a self-oscillating mask circuit configured to generate a mask signal under a preset refresh command; and
   a refresh address counter configured to count refresh addresses based on the self-oscillating clock signal and the mask signal and to output a self-oscillating refresh address;
   wherein the preset refresh command comprises a same-bank refresh command, an all-bank refresh command, or a self-refresh command;
   wherein the mask signal comprises: a mask sub-signal for masking the self-oscillating clock signal, and a non-mask sub-signal for not masking the self-oscillating clock signal;
   wherein the self-oscillating mask circuit comprises an all-bank refresh mask sub-circuit and a same-bank refresh mask sub-circuit, and wherein
   the all-bank refresh mask sub-circuit is configured to: in response to reception of the all-bank refresh command in a normal refresh mode, generate the mask sub-signal in a normal refresh mode when a lowest bit of a current refresh address is an odd number; and
   the same-bank refresh mask sub-circuit is configured to: in response to reception of the same-bank refresh command, generate the mask sub-signal before all banks are refreshed.

2. The refresh address counting circuit of claim 1, wherein the all-bank refresh mask sub-circuit is further configured to: in response to reception of the all-bank refresh command in the normal refresh mode, generate the non-mask sub-signal in the normal refresh mode when the lowest bit of the current refresh address is an even number.

3. The refresh address counting circuit of claim 1, wherein the all-bank refresh mask sub-circuit is further configured to turn off the mask sub-signal and generate the non-mask sub-signal in response to generating a system reset signal or receiving a cycle refresh command in the next refresh cycle.

4. The refresh address counting circuit of claim 1, wherein the same-bank refresh mask sub-circuit comprises a bank refresh counter, a reset signal generator, and a-mask signal generator, wherein
   the bank refresh counter is configured to obtain a refresh state of each of banks, and generate a refresh cycle signal after each bank has been refreshed once;
   the mask signal generator is configured to generate the mask sub-signal or the non-mask sub-signal based on the refresh state of each bank; and
   the reset signal generator is configured to generate, based on the all-bank refresh command, a self-refresh command, a system reset signal and the refresh cycle signal, a reset signal for resetting the bank refresh counter to generate the non-mask sub-signal.

5. The refresh address counting circuit of claim 4, wherein the mask signal generator comprises a second NOT gate, a second NAND gate, and a second latch, wherein
   a first input terminal of the second NAND gate is configured to receive the refresh cycle signal through the second NOT gate, a second input terminal of the second NAND gate is configured to receive the same-bank refresh command, and an output terminal of the second NAND gate is connected to a reset terminal of the second latch; and
   a set terminal of the second latch is configured to receive the reset signal, and an output terminal of the second latch is configured to output the mask signal.

6. The refresh address counting circuit of claim 1, wherein the self-oscillating clock generation circuit comprises an edge generation circuit and a delay circuit, and wherein
   the edge generation circuit is configured to acquire each of the at least one bank activation signal in the refresh cycle, and extract falling edge information of the bank activation signal; and
   the delay circuit is configured to adjust timing of the falling edge information.

7. A refresh address counting method, performed by a refresh address counting circuit including a self-oscillating clock generation circuit, a self-oscillating mask circuit, and a refresh address counter, the method comprising:

generating, by the self-oscillating clock generation circuit, a self-oscillating clock signal based on at least one bank activation signal in each of refresh cycles, upon acquiring a refresh signal;

generating, by the self-oscillating mask circuit, a mask signal under a preset refresh command; and counting, by the refresh address counter, refresh addresses based on the self-oscillating clock signal and the mask signal and outputting, by the refresh address counter, a self-oscillating refresh address;

wherein the preset refresh command comprises a same-bank refresh command, an all-bank refresh command, or a self-refresh command;

the mask signal comprises: a mask sub-signal for masking the self-oscillating clock signal, and a non-mask sub-signal for not masking the self-oscillating clock signal;

the self-oscillating mask circuit comprises an all-bank refresh mask sub-circuit and a same-bank refresh mask sub-circuit, and wherein generating, by the all-bank refresh mask sub-circuit, the mask sub-signal in a normal refresh mode when a lowest bit of a current refresh address is an odd number, in response to reception of the all-bank refresh command in a normal refresh mode; and generating, by the same-bank refresh mask sub-circuit, the mask sub-signal before all banks are refreshed in response to reception of the same-bank refresh command.

8. A refresh address read-write circuit, comprising a latch circuit, a decoder, a reading circuit, and a refresh address counting circuit, wherein an output terminal of the refresh address counting circuit is connected to an input terminal of the latch circuit, an output terminal of the latch circuit is connected to an input terminal of the decoder, and an output terminal of the decoder is connected to the reading circuit, and wherein the refresh address counting circuit includes:

a self-oscillating clock generation circuit, configured to generate a self-oscillating clock signal based on at least one bank activation signal in each of refresh cycles, upon acquiring a refresh signal;

a self-oscillating mask circuit, configured to generate a mask signal under a preset refresh command; and a refresh address counter, configured to count refresh addresses based on the self-oscillating clock signal and the mask signal and to output a self-oscillating refresh address.

9. The refresh address read-write circuit of claim 8, wherein the latch circuit comprises a multiplexer and a latch, and wherein an input terminal of the multiplexer is configured to receive a self-oscillating refresh address and activation address from the refresh address counting circuit, a control terminal of the multiplexer is configured to receive a refresh cycle signal, an output terminal of the multiplexer is connected to an input terminal of the latch, and an output terminal of the latch is connected to the decoder.

* * * * *